United States Patent
Maarouf et al.

(10) Patent No.: US 10,173,645 B2
(45) Date of Patent: Jan. 8, 2019

(54) EXPANDABLE WIPER SYSTEM

(71) Applicant: FORD GLOBAL TECHNOLOGIES, LLC, Dearborn, MI (US)

(72) Inventors: Ahmad Maarouf, Canton, MI (US); Mahmoud Yousef Ghannam, Canton, MI (US); Muhannad Hamdan, Canton, MI (US); Swadad A. Carremm, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 15 days.

(21) Appl. No.: 15/332,083

(22) Filed: Oct. 24, 2016

(65) Prior Publication Data

US 2018/0111587 A1  Apr. 26, 2018

(51) Int. Cl.
*B60S 1/08* (2006.01)
*B60S 1/36* (2006.01)

(52) U.S. Cl.
CPC ............... *B60S 1/365* (2013.01); *B60S 1/08* (2013.01)

(58) Field of Classification Search
CPC .............. B60S 1/36; B60S 1/365; B60S 1/08
USPC ......................................... 15/250.21, 250.23
See application file for complete search history.

(56) References Cited

U.S. PATENT DOCUMENTS

| | | | | | |
|---|---|---|---|---|---|
| 3,092,865 | A | * | 6/1963 | Nassib | B60S 1/28 15/250.23 |
| 4,707,641 | A | * | 11/1987 | Guerard | B60S 1/08 318/443 |
| 5,301,383 | A | * | 4/1994 | Suzuki | B60S 1/20 15/250.23 |
| 5,333,350 | A | * | 8/1994 | Shirato | B60S 1/08 15/250.13 |

FOREIGN PATENT DOCUMENTS

| | | | |
|---|---|---|---|
| CN | 201211879 Y | | 3/2009 |
| CN | 201816557 U | | 5/2011 |
| CN | 105383445 A | | 3/2016 |
| CN | 205131199 U | | 4/2016 |
| DE | 102005013178 | * | 9/2006 |
| EP | 0210762 | * | 2/1987 |
| FR | 1301379 | * | 7/1962 |
| GB | 1429807 A | | 3/1976 |

OTHER PUBLICATIONS

English Machine Translation of CN105383445A.
English Machine Translation of CN205131199U.
English Machine Translation of CN201816557U.
English Machine Translation of CN201211879Y.

* cited by examiner

*Primary Examiner* — Gary K. Graham
(74) *Attorney, Agent, or Firm* — Jason Rogers; King & Schickli PLLC (57) ABSTRACT

A vehicle window wiper system includes a wiper arm having a sliding joint operated by a linear actuator which selectively extends and retract the sliding joint. A controller is config- (Continued)

ured to cause the linear actuator to selectively extend and retract the sliding joint. A wiper arm rotational position provided to the controller determines whether the wiper arm should be in an extended or a retracted position.

15 Claims, 7 Drawing Sheets

EXPANDABLE WIPER SYSTEM

TECHNICAL FIELD

This disclosure relates generally to motor vehicle wiper systems. More particularly, the disclosure relates to an expandable wiper system for a vehicle.

BACKGROUND

While generally effective for their intended purpose, conventional window wiper systems typically include wiper arm/blade assemblies having a fixed length. Design constraints dictate that the fixed length wiper arm/blade assembly cannot clear certain areas of a window, for example areas adjacent the corner of the window.

Moreover, in cold conditions wiper blades tend to accumulate ice and snow, which impairs their ability to efficiently clear a window. In cold conditions when a wiper system is not in use, such buildup of ice and snow may cause the wiper blades to freeze to the window. Currently, a user's only option is to manually clean the blades to remove ice and snow buildup.

Accordingly, a need is identified in the art for window wiper systems which do not suffer from the above disadvantages. The present disclosure meets this need by providing an expandable wiper system including mechanisms and control systems which allow the wiper blade to reach a significantly greater portion of the window compared to a conventional wiper system. The described expandable wiper system mechanisms further provide a linear blade motion allowing removal of snow and ice buildup.

SUMMARY

In accordance with the purposes and benefits described herein and to solve the above-summarized and other problems, in one aspect a vehicle window wiper system is provided, comprising a wiper arm comprising a sliding joint having a linear actuator. In an embodiment, the linear actuator includes a biasing member and a linear solenoid arranged to selectively extend and retract the sliding joint. The linear actuator is operatively connected to a controller. The controller selectively causes the linear actuator to extend and retract the sliding joint between a normal operating mode and an extended operating mode according to a plurality of inputs including a window wiper motor torque value, a window wiper motor shaft rotational speed value, and a wiper arm position relative to a vehicle window perimeter.

The wiper arm position may be determined by determining a rotational angle of the wiper arm. In embodiments, the wiper arm position is determined by an imager communicating with the controller. The imager may be an on-board camera disposed to capture images of at least a portion of the vehicle window. In alternative embodiments, the wiper arm position is determined by a potentiometer.

In another aspect, a vehicle window wiper system is provided, comprising a wiper arm comprising a sliding joint having a linear actuator operating to selectively extend and retract the sliding joint. A controller is operatively connected to the linear actuator, configured to cause the linear actuator to selectively extend and retract the sliding joint. The controller selectively causes the linear actuator to extend and retract the sliding joint between a normal operating mode and an extended operating mode according to a plurality of inputs including a window wiper motor torque value, a window wiper motor shaft rotational speed value, and a wiper arm position relative to a vehicle window perimeter.

The wiper arm position may be determined by determining a rotational angle of the wiper arm. In embodiments, the wiper arm position is determined by an imager communicating with the controller. The imager may be an on-board camera disposed to capture images of at least a portion of the vehicle window. In alternative embodiments, the wiper arm position is determined by a potentiometer.

In embodiments, the linear actuator comprises a biasing member and a linear solenoid arranged to selectively extend and retract the sliding joint. In alternative embodiments, the linear actuator comprises a hydraulic or pneumatic piston which operates to selectively extend and retract the sliding joint.

In yet another aspect, a vehicle window wiper system is provided, comprising a wiper arm comprising a sliding joint having a linear actuator operating to selectively extend and retract the sliding joint. A controller operates to cause the linear actuator to selectively extend and retract the sliding joint according to a wiper arm position relative to a vehicle window perimeter. A potentiometer is arranged to provide the wiper arm position to the controller. The controller selectively causes the linear actuator to translate the sliding joint between a normal operating mode and an extended operating mode according to a plurality of inputs including a window wiper motor torque value, a window wiper motor shaft rotational speed value, and the wiper arm position.

In embodiments, the linear actuator comprises a biasing member and a linear solenoid arranged to selectively extend and retract the sliding joint. In alternative embodiments, the linear actuator comprises a hydraulic or pneumatic piston which operates to selectively extend and retract the sliding joint.

In the following description, there are shown and described embodiments of an expandable wiper system. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed expandable wiper system, and together with the description serve to explain certain principles thereof. In the drawing.

Reference will now be made in detail to embodiments of the disclosed expandable wiper system, examples of which are illustrated in the accompanying drawing figures wherein like reference numerals indicate like features.

DETAILED DESCRIPTION

Figure 1:
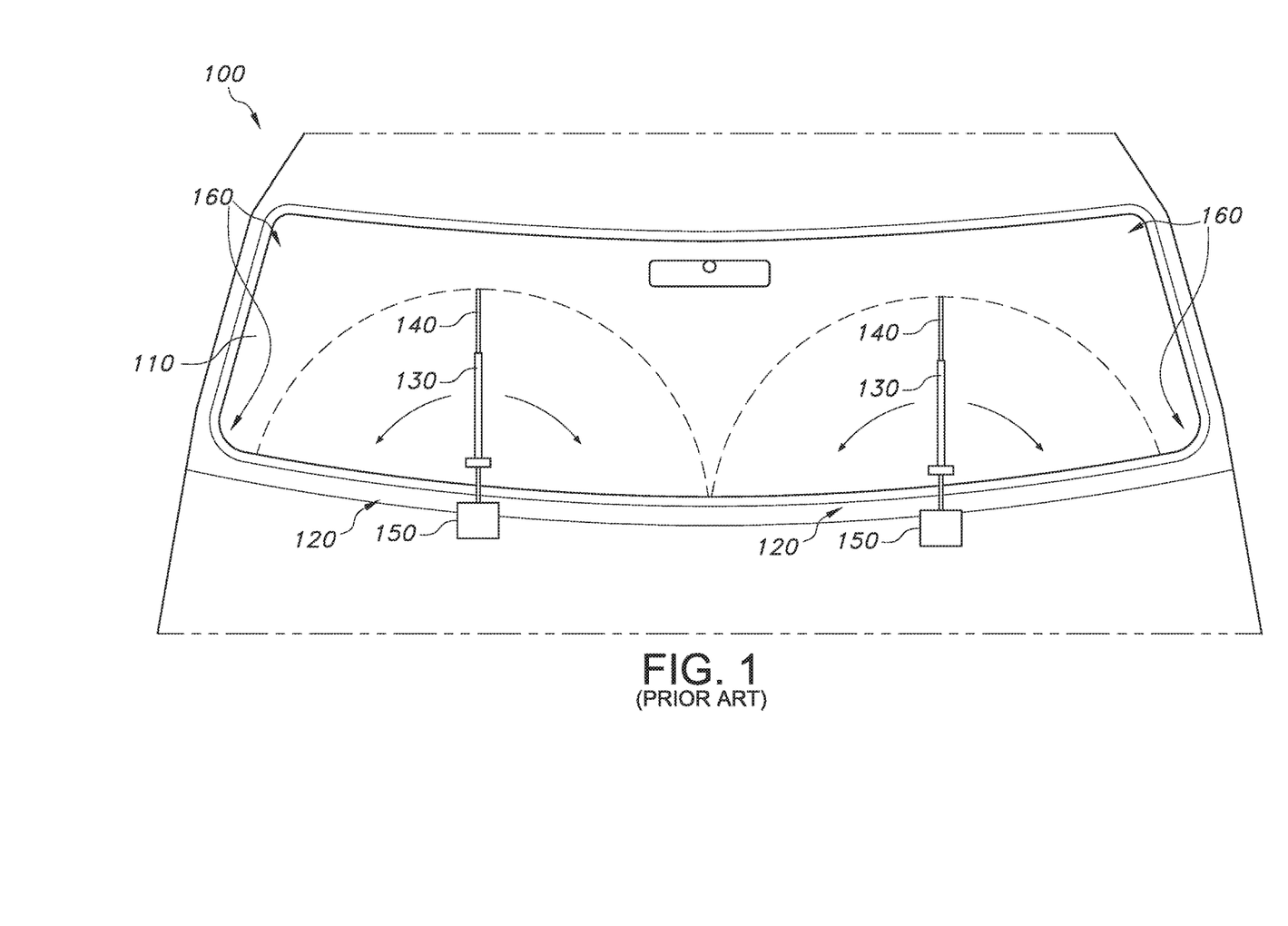
FIG. 1 depicts a prior art wiper system.

FIG. 1 depicts a vehicle 100 including a windshield 110 to which is mounted a prior art wiper assembly 120 including a wiper arm 130 and a wiper blade 140. The skilled artisan will appreciate that it is known to provide wiper assemblies for other vehicle 100 glass surfaces, for example a rear window, headlamp covers, and others. Application of the presently described wiper systems to all such surfaces is contemplated, and so the description will not be taken as limiting in this regard.

Returning to FIG. 1, as is known the wiper arms 130 are each operationally connected to a motor and shaft drive (generally represented by reference numeral 150) which impart an alternating clock-wise/counterclockwise rotation cycle to the wiper arms as shown to clean a region of windshield 110. As can be seen, this prior art assembly including a fixed length wiper arm 130 cannot clean all areas of the windshield 110, in particular the windshield corners 160. The same is true of the coverage area of wiper arms 130 on other vehicle window surfaces such as the rear window.

Figure 2:
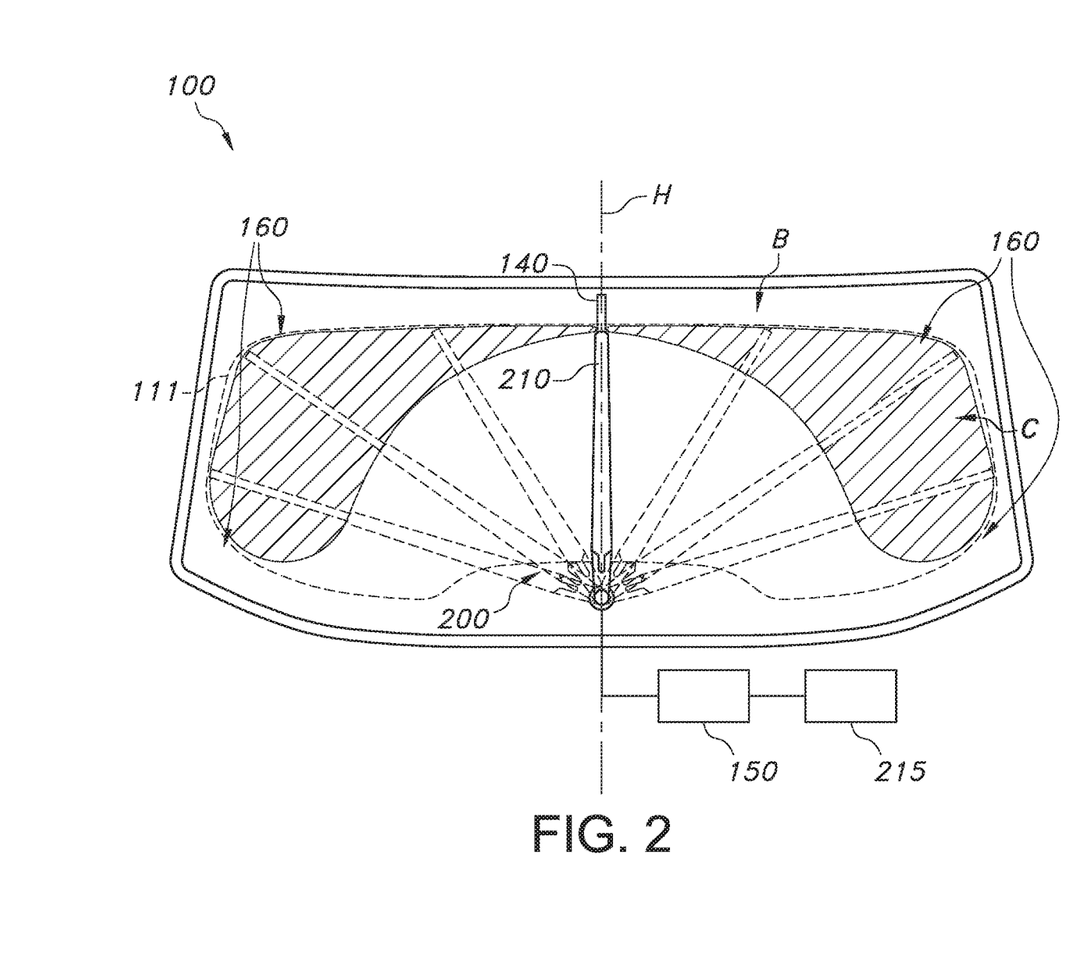
FIG. 2 depicts an expandable wiper system according to the present disclosure associated with a rear window of a vehicle.

To solve this and other problems, with reference to FIG. 2 there is provided an expandable windshield wiper system 200, in the depicted embodiment being associated with a vehicle 100 rear window 111. The wiper system 200 includes a wiper blade 140 and an expandable wiper arm 210 which, as shown in the drawing, may be extended and retracted as needed to clean a greater portion of the window 111, including the corners 160. The expandable wiper system 200 further includes a controller 215 in operative communication with the wiper motor 150, the purpose of which will be described in greater detail below.

Figure 3:
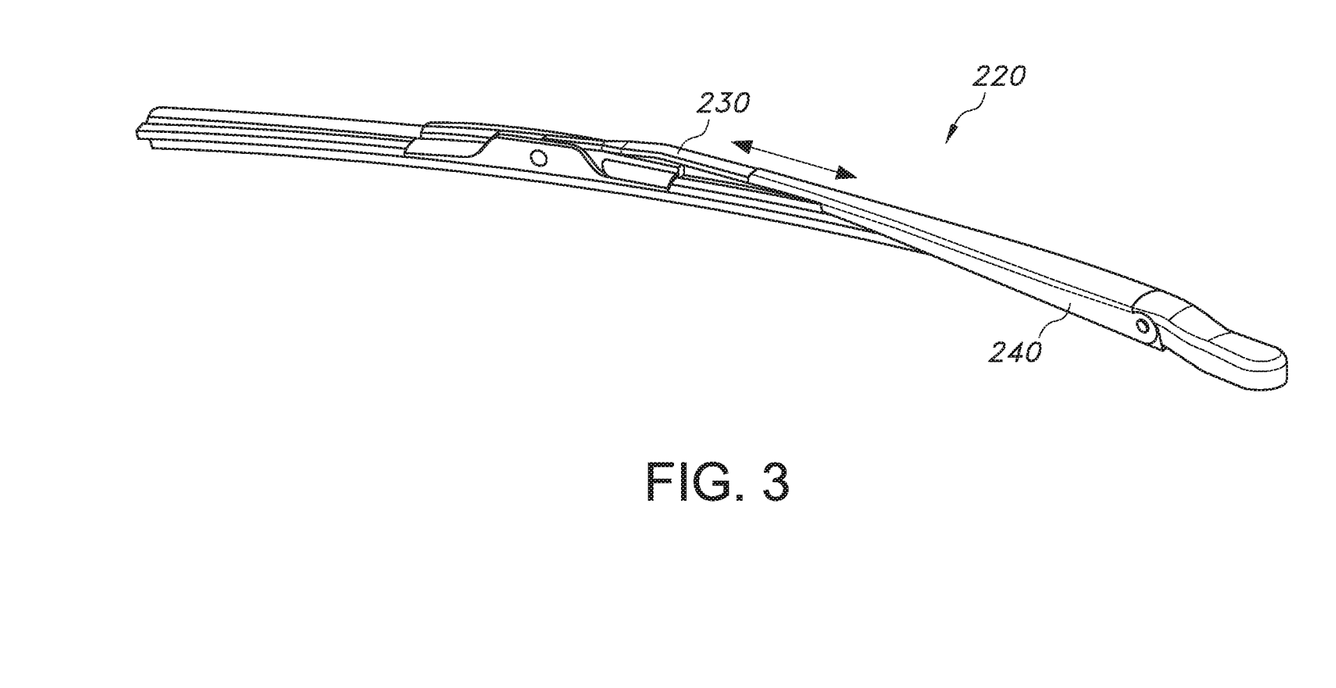
FIG. 3 depicts an expandable wiper arm for use in the wiper system of FIG. 2.

The expandable wiper arm 210 is provided with a sliding joint 220 (see FIG. 3) which allows the wiper arm and associated wiper blade 140 to be extended from a first length which may be a standard wiper arm length to a second, extended length to clear additional portions of a vehicle window (not shown in this view) or other surface. The sliding joint 220 may be provided by any suitable configuration of wiper arm 210. As shown in the depicted embodiment, the wiper arm 210 may be defined by a first wiper arm segment 230 and a second wiper arm segment 240, configured as a telescoping rod.

Figure 4:
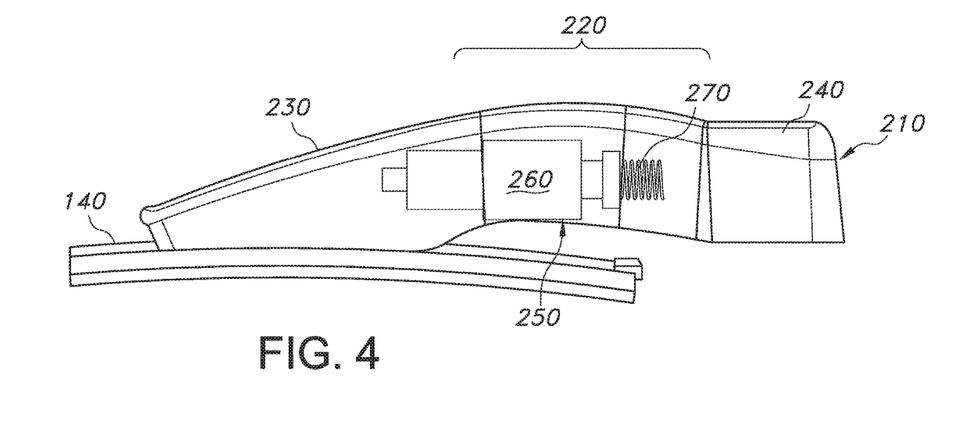
FIG. 4 depicts an embodiment of a linear actuator for the expandable wiper arm of FIG. 3.
Figure 5:
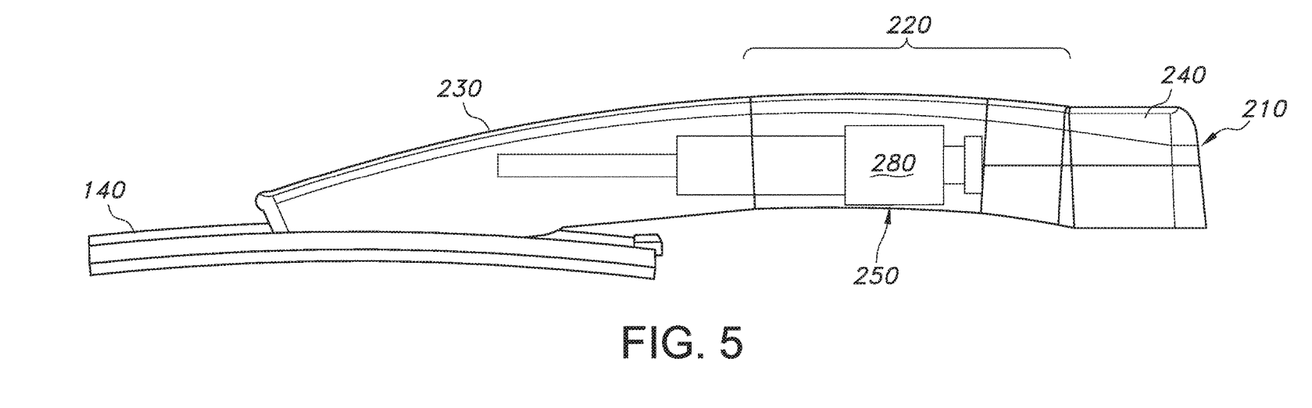
FIG. 5 depicts an alternative embodiment of a linear actuator for the expandable wiper arm of FIG. 3.

The expandable wiper arm 210 is further provided with a linear actuator 250 operating to selectively extend and retract the sliding joint 220. In the embodiment shown in FIG. 4, the linear actuator 250 comprises a linear solenoid 260 disposed as shown to allow extension of the sliding joint 220 and a wiper blade 140 affixed thereto. A biasing member 270, in the depicted embodiment being a coil spring, is disposed to provide a countering biasing force to the linear solenoid 260. Thus, as will be appreciated, when the linear solenoid 260 is actuated to extend the sliding joint 220, the biasing member 270 is extended and a tensioning force is loaded. When the linear solenoid 260 is stopped, the biasing member 270 returns to its original configuration, retracting or assisting in retracting the sliding joint 220 to its original position.

In an alternative embodiment (see FIG. 4), the linear actuator 250 may be a pneumatic or hydraulically actuated cylinder 280 disposed to extend and retract the sliding joint 220 as described above.

Figure 6:
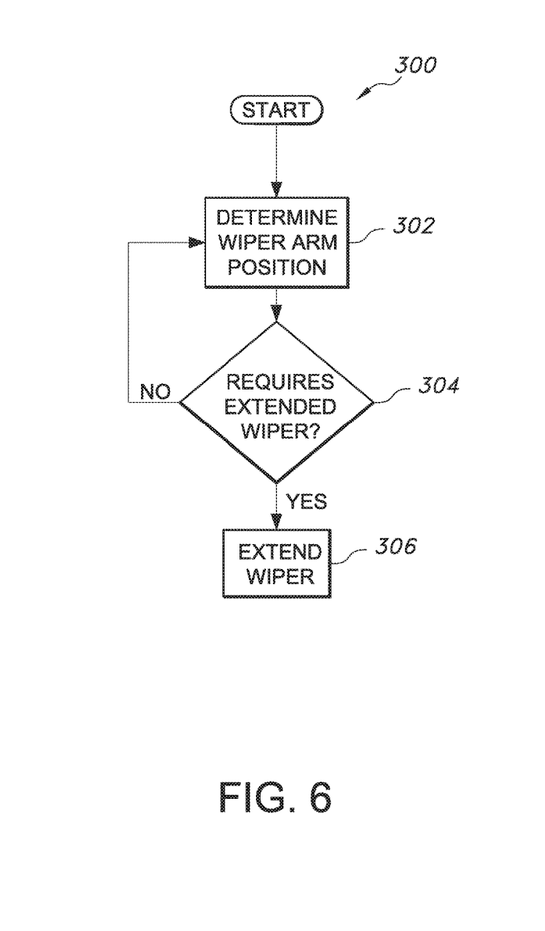
FIG. 6 depicts an embodiment of a control scheme for an expandable wiper system according to the present disclosure.

The wiper system 200 is further provided with a control system to determine when and if the expandable wiper arm 210 should be extended. In an embodiment, the system controller 215 selectively causes the linear actuator 250 to extend and retract the sliding joint 220 between a normal operating mode and an extended operating mode (see FIG. 2) according to a plurality of inputs including a windshield wiper motor 150 torque value, a windshield wiper motor 150 shaft rotational speed value, and a wiper arm 210 position relative to a vehicle window 111 perimeter. This is shown at a high level in FIG. 6 which depicts a method 300 for controlling the expandable wiper system 200. At step 302, the controller 215 determines a wiper arm 210 position relative to the window 111 perimeter. At step 304, the controller 215 determines whether that determined wiper arm 210 position requires a retracted, a partially extended, or a fully extended wiper arm 210 according to the amount of the window 111 to be cleaned at that wiper arm position. If not, the wiper arm 210 is kept at the retracted position. If so, the wiper arm 210 is extended to the desired length by the mechanisms described above.

It is contemplated to determine the wiper arm 210 position relative to the window 111 perimeter by a variety of methods. In one embodiment (see FIG. 7), a method 308 is described wherein the controller 215 extrapolates the wiper arm 210 position according to a rotational angle of the wiper arm. That is, as the wiper arm 210 rotates through a full cycle, the rotational angle of the wiper arm 210 relative to a vertical axis H (see FIG. 2) or other reference point can be determined. From that information, it can be determined whether the wiper arm 210 is in an orientation requiring a shortened length A such as collinear with the vertical axis H, at an orientation requiring an intermediate length B, or at an orientation requiring a full length C, for example in the area of the windshield corner 160.

Figure 7:
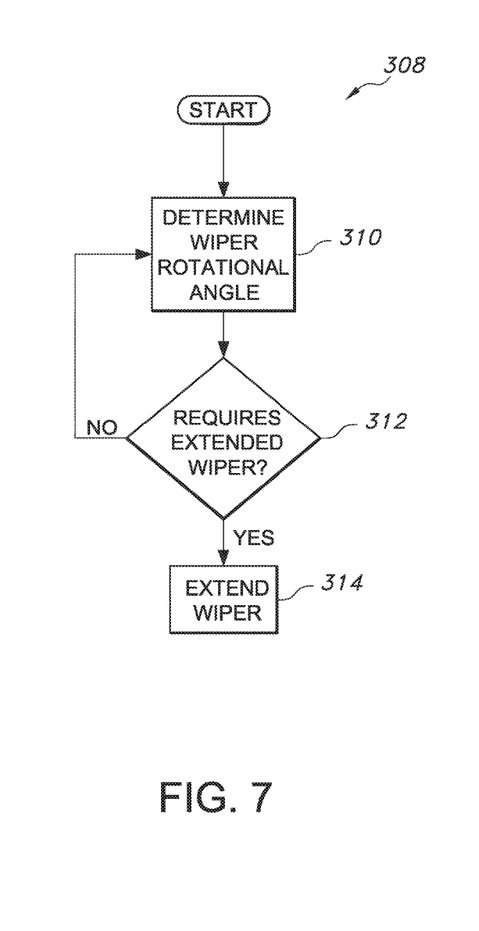
FIG. 7 depicts an alternative embodiment of a control scheme for an expandable wiper system according to the present disclosure.

According to the method 308, at step 310, the controller 215 determines a wiper arm 210 rotational angle relative to the vertical axis H. At step 312, the controller 215 determines whether that determined wiper arm 210 position requires a retracted, a partially extended, or a fully extended wiper arm 210 according to the amount of the window 111 to be cleared at that wiper arm position. If not, the wiper arm 210 is kept in the retracted configuration. If so, the wiper arm 210 is extended to the desired length by the mechanisms described above.

For example, as shown in FIG. 2 the wiper arm 210 rotates through a 180 degree range of motion, initially moving clockwise from a driver's perspective. One exemplary though non-limiting scheme for programming wiper arm 210 extension and retraction could be:

1. start at 0 degrees and 0 extension/reset position—controller issues command to begin to extend wiper arm 210.
2. at 45 degrees/diagonal position #1—controller issues command to begin to retract wiper arm 210.
3. at 90 degrees/vertical position—controller issues command to begin to extend wiper arm 210.
4. at 135 degrees/diagonal position #2—controller issues command to begin to retract wiper arm 210.
5. end at 180 degrees and full extension/final position.

This programming cycle would be reversed as the wiper arm 210 traveled through its return stroke, i.e. the 180 degree counterclockwise (from the driver's perspective)

cycle. Thus, under this scheme the expansion length for the wiper arm 210 would be defined based on a calibrated relationship between the wiper arm angle relative to a vertical line and the window 111 dimension.

Figure 8:
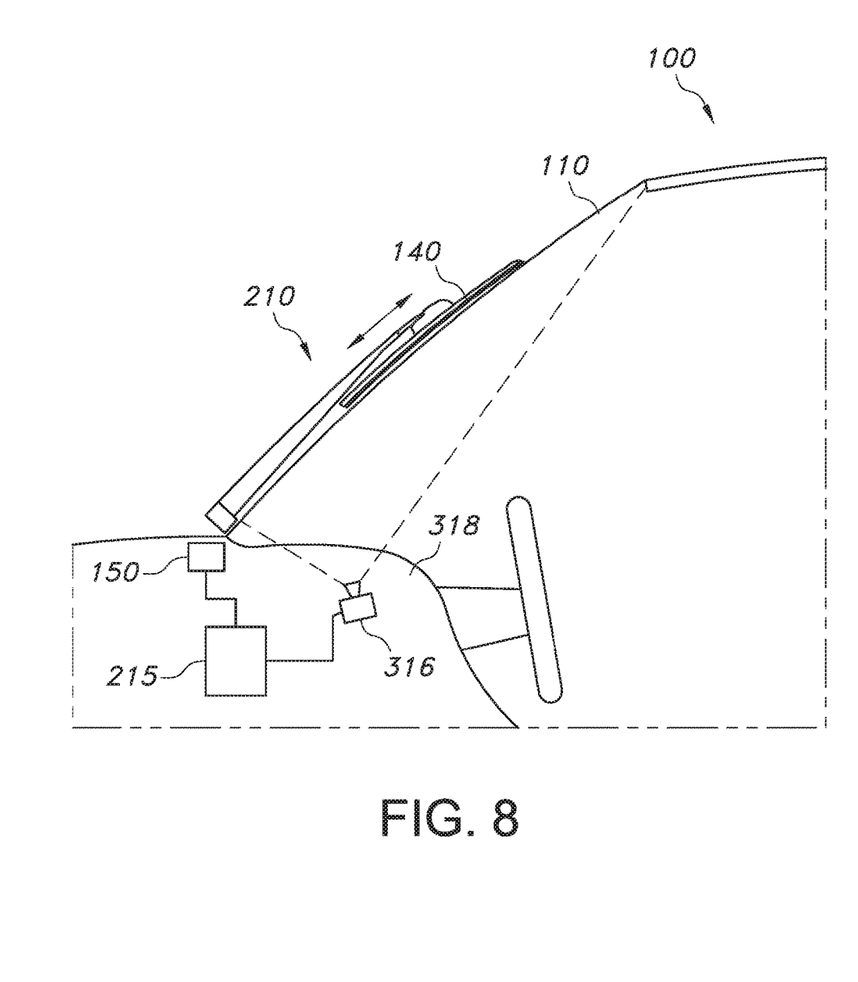
FIG. 8 depicts an embodiment of a system for determining a wiper arm orientation/rotational angle.

The wiper arm 210 orientation/rotational angle may be determined by a variety of systems. With reference to FIG. 8, in one embodiment the controller 215 communicates with an imager 316 disposed to image at least a portion of the window 111 and the wiper arm 210/wiper blade 140 as they traverse over the window surface. The imager may be an on-board camera disposed in or on the vehicle 100 dash panel 318. From images taken by the imager 316, the controller 215 can determine a wiper arm 210 position/rotational angle and adjust a length of the wiper arm 210 accordingly as described above. In embodiments, reference points such as target points, lines, etc. may be provided on an edge of the window 111. These would appear on images taken by the imager 316, from which the controller 215 could determine a distance relationship between a wiper arm 210 edge and a window 111 perimeter, and also a rotational angle of the wiper arm.

Figure 9:
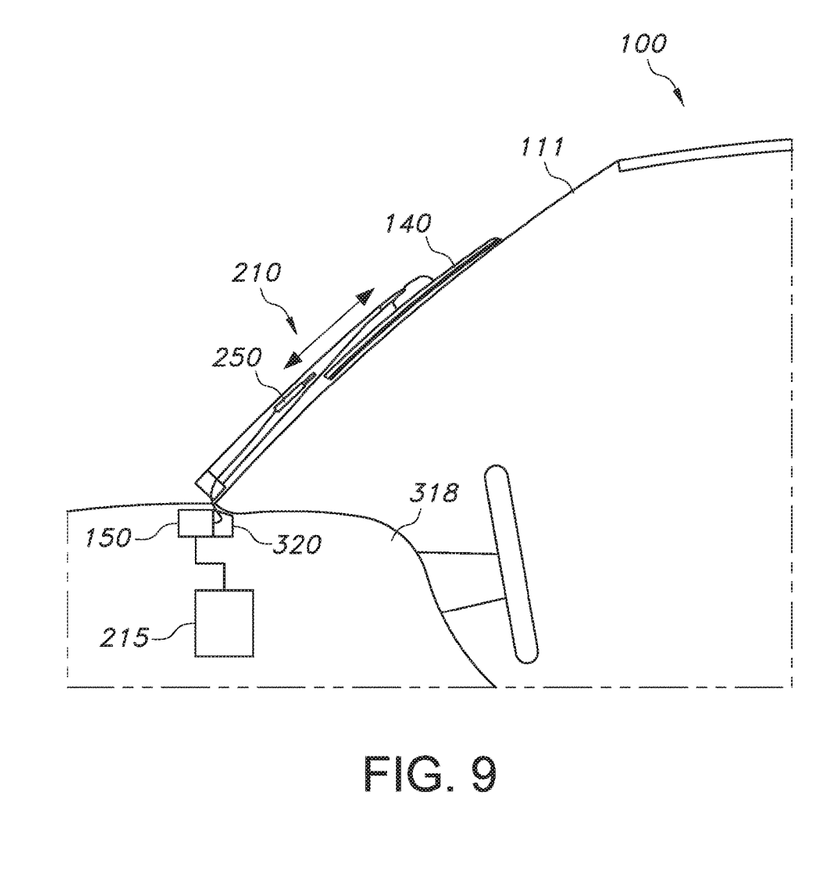
FIG. 9 depicts an alternative embodiment of a system for determining a wiper arm orientation/rotational angle.

With reference to FIG. 9, in another embodiment a potentiometer 320 associated with the wiper motor 150 and in operative communication with the wiper arm linear actuator 250 determines when and how far to extend the expandable wiper arm 210. As is known, a potentiometer 320 can be configured to issue electrical pulses at predetermined positions of a motor shaft. So, as the rotational shaft of the wiper motor 150 rotates through its clockwise/counterclockwise cycle as described above, at predetermined rotational angles associated with portions of the window 111 requiring an extended length wiper arm 210 the associated potentiometer 320 may be configured to supply an electrical impulse to the linear actuator 250, thus causing the wiper arm 210 to extend to the desired length.

As will be appreciated, by the foregoing described features a convenient and effective windshield wiper assembly 200 which allows clearing a significantly greater portion of a windshield 110, window 111, etc. compared to a conventional wiper assembly. In addition, as will be appreciated, by the linear motion imparted by the expandable wiper arm 210, a user can actuate the described wiper assembly 200 to break up collected ice and snow, even in very cold conditions causing freezing of the wiper blade 140 to the windshield 110 or the window 111.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle window wiper system, comprising a wiper arm comprising a sliding joint having a linear actuator operatively connected to a controller and including a biasing member and a linear solenoid arranged to selectively extend and retract the sliding joint;
   wherein the controller selectively causes the linear actuator to extend and retract the sliding joint between a normal operating mode and an extended operating mode according to a plurality of inputs including a window wiper motor torque value, a window wiper motor shaft rotational speed value, and a wiper arm position relative to a vehicle window perimeter.

2. The system of claim 1, wherein the wiper arm position is determined by determining a rotational angle of the wiper arm.

3. The system of claim 1, wherein the wiper arm position is determined by an imager.

4. The system of claim 3, wherein the imager is an on-board camera disposed to capture images of at least a portion of the vehicle window.

5. The system of claim 1, wherein the wiper arm position is determined by a potentiometer.

6. A vehicle window wiper system, comprising:
   a wiper arm comprising a sliding joint having a linear actuator operating to selectively extend and retract the sliding joint; and
   a controller operatively connected to the linear actuator, configured to cause the linear actuator to selectively extend and retract the sliding joint;
   wherein the controller selectively causes the linear actuator to extend and retract the sliding joint between a normal operating mode and an extended operating mode according to a plurality of inputs including a window wiper motor torque value, a window wiper motor shaft rotational speed value, and a wiper arm position relative to a vehicle window perimeter.

7. The system of claim 6, wherein the wiper arm position is determined by determining a rotational angle of the wiper arm.

8. The system of claim 6, wherein the wiper arm position is determined by an imager.

9. The system of claim 8, wherein the imager is an on-board camera disposed to capture images of at least a portion of the vehicle window.

10. The system of claim 6, wherein the wiper arm position is determined by a potentiometer.

11. The system of claim 6, wherein the linear actuator comprises a biasing member and a linear solenoid arranged to selectively extend and retract the sliding joint.

12. The system of claim 6, wherein the linear actuator comprises a hydraulic or pneumatic piston which operates to selectively extend and retract the sliding joint.

13. A vehicle window wiper system, comprising:
   a wiper arm comprising a sliding joint having a linear actuator operating to selectively extend and retract the sliding joint;
   a controller operating to cause the linear actuator to selectively extend and retract the sliding joint according to a wiper arm position relative to a vehicle window perimeter; and
   a potentiometer arranged to provide the wiper arm position to the controller;
   wherein the controller selectively causes the linear actuator to translate the sliding joint between a normal operating mode and an extended operating mode according to a plurality of inputs including a window wiper motor torque value, a window wiper motor shaft rotational speed value, and the wiper arm position.

14. The system of claim 13, wherein the linear actuator comprises a biasing member and a linear solenoid arranged to selectively extend and retract the sliding joint.

15. The system of claim 13, wherein the linear actuator comprises a hydraulic or pneumatic piston which operates to selectively extend and retract the sliding joint.

* * * * *